United States Patent
Dasari et al.

(10) Patent No.: US 9,043,932 B2
(45) Date of Patent: May 26, 2015

(54) MANAGING PHYSICAL PRESENCE ACROSS MULTIPLE BLADES

(71) Applicant: International Business Machines Corporation, Armonk, NY (US)

(72) Inventors: Shiva R. Dasari, Austin, TX (US); Raghuswamyreddy Gundam, Austin, TX (US); Karthik Kolavasi, Austin, TX (US); Newton P. Liu, Austin, TX (US); Douglas W. Oliver, Round Rock, TX (US); Nicholas A. Ramirez, Austin, TX (US); Mehul M. Shah, Austin, TX (US); Wingcheung Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/016,382

(22) Filed: Sep. 3, 2013

(65) Prior Publication Data

US 2015/0067309 A1   Mar. 5, 2015

Related U.S. Application Data

(63) Continuation of application No. 14/013,848, filed on Aug. 29, 2013.

(51) Int. Cl.
*G06F 21/00* (2013.01)
*G06F 9/44* (2006.01)

(52) U.S. Cl.
CPC .................................. *G06F 9/4401* (2013.01)

(58) Field of Classification Search
CPC ..... G06F 9/4401; G06F 21/57; G06F 21/577; G06F 21/72; G06F 21/55; G06F 21/554; H04L 9/3234; H04L 2209/127

USPC ........................................................... 726/27
See application file for complete search history.

(56) References Cited

U.S. PATENT DOCUMENTS

| | | | |
|---|---|---|---|
| 7,907,051 | B2 | 3/2011 | Pall et al. |
| 8,028,165 | B2 | 9/2011 | Ali et al. |
| 2004/0193883 | A1 | 9/2004 | Alperin et al. |
| 2004/0205362 | A1* | 10/2004 | Catherman et al. ........... 713/300 |
| 2006/0031448 | A1* | 2/2006 | Chu et al. ...................... 709/223 |
| 2009/0172806 | A1* | 7/2009 | Natu et al. ...................... 726/16 |

OTHER PUBLICATIONS

Sun Oracale "Oracle® Integrated Lights Out Manager (ILOM) 3.0 Supplement for the Sun Blade X6275 M2 Server Module", Part No. 821-1081, Jan. 2011, Rev A, 80 pages.

* cited by examiner

*Primary Examiner* — Yogesh Paliwal
(74) *Attorney, Agent, or Firm* — Jeffrey L. Streets

(57) ABSTRACT

A method uses a firmware interface setup program for a selected compute node ("node") to cause a firmware interface to enable a trusted platform module (TPM) on the selected node to receive a physical presence (PP) signal. The selected node is selected from a plurality of nodes within a multi-node chassis, wherein each node includes a firmware interface and a TPM. A device within the multi-node chassis is manually actuated to transmit a PP signal to each of the plurality of nodes, such that each node receives the PP signal. The PP signal is asserted to the TPM of the selected node in response to both enabling the TPM of the selected node to be able to receive the PP signal and receiving the PP signal. Still further, the method allows modification of a security setting of the selected node in response to the TPM receiving the PP signal.

20 Claims, 3 Drawing Sheets

MANAGING PHYSICAL PRESENCE ACROSS MULTIPLE BLADES

CROSS-REFERENCE TO RELATED APPLICATIONS

This application in a continuation co-pending U.S. patent application Ser. No. 14/013,848, filed on Aug. 29, 2013.

BACKGROUND

1. Field of the Invention

The present invention relates to systems having a trusted platform module, and methods of asserting physical presence to a trusted platform module.

2. Background of the Related Art

A Trusted Platform Module (TPM) is a microcontroller that stores keys, passwords and digital certificates. A TPM is typically installed on the motherboard of a computer or any computing device that requires these functions. The nature of this microcontroller ensures that the information stored on the computer is made more secure from external software attack and physical theft. Security processes, such as digital signature and key exchange, are protected through by the TPM. For example, the TPM may deny access to data and secrets in a platform if the boot sequence is not as expected. Critical applications and capabilities such as secure email, secure web access and local protection of data are thereby made much more secure.

BRIEF SUMMARY

One embodiment of the present invention provides a method comprising using a firmware interface setup program for a selected compute node to cause a firmware interface on the selected compute node to enable a trusted platform module on the selected compute node to be able to receive a physical presence signal. The selected compute node is selected from a plurality of compute nodes within a multi-node chassis, wherein each of the plurality of compute nodes includes a firmware interface and a trusted platform module. The method further comprises manually actuating a device within the multi-node chassis to transmit a physical presence signal to each of the plurality of compute nodes within the multi-node chassis, such that each of the plurality of compute nodes within the multi-node chassis receives the physical presence signal. The physical presence signal is asserted to the trusted platform module of the selected compute node in response to both enabling the trusted platform module of the selected compute node to be able to receive the physical presence signal and receiving the physical presence signal. Still further, the method comprises allowing modification of one or more security setting of the selected compute node in response to the trusted platform module of the selected compute node receiving the physical presence signal.

DETAILED DESCRIPTION

Figure 1:
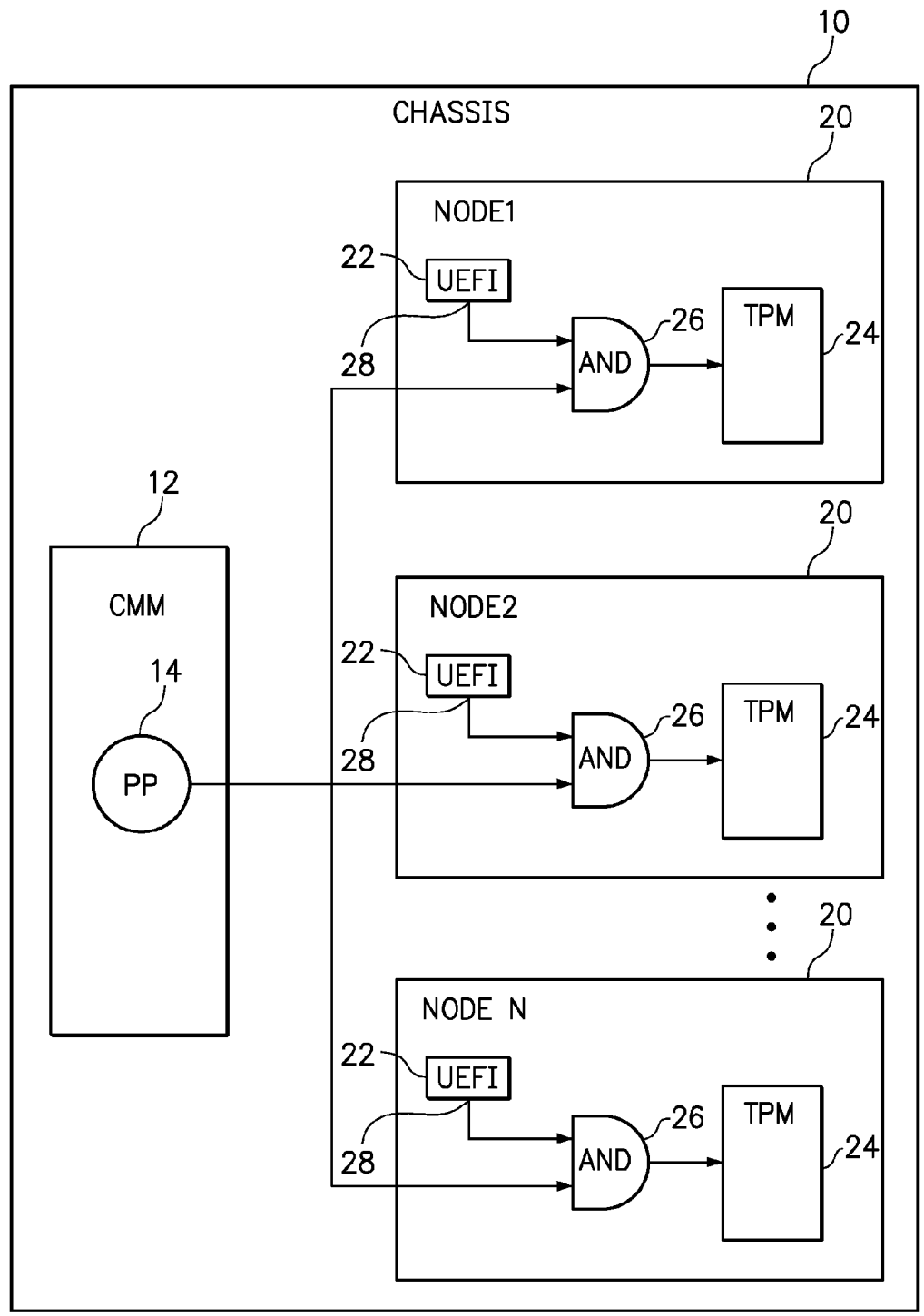
FIG. 1 is a diagram of multi-node chassis including a plurality of compute nodes within the chassis in accordance with one embodiment of the present invention.

One embodiment of the present invention provides a method comprising using a firmware interface setup program for a selected compute node to cause a firmware interface on the selected compute node to enable a trusted platform module on the selected compute node to be able to receive a physical presence signal. The selected compute node is selected from a plurality of compute nodes within a multi-node chassis, wherein each of the plurality of compute nodes includes a firmware interface and a trusted platform module. The method further comprises manually actuating a device within the multi-node chassis to transmit a physical presence signal to each of the plurality of compute nodes within the multi-node chassis, such that each of the plurality of compute nodes within the multi-node chassis receives the physical presence signal. The physical presence signal is asserted to the trusted platform module of the selected compute node in response to both enabling the trusted platform module of the selected compute node to be able to receive the physical presence signal and receiving the physical presence signal. Still further, the method comprises allowing modification of one or more security setting of the selected compute node in response to the trusted platform module of the selected compute node receiving the physical presence signal.

The multi-node chassis may, for example, be a multi-server chassis, such as a multi-blade chassis. A multi-node chassis will typically provide various services to each compute node within the multi-node chassis, such as a power source, network communications, and forced air circulation. It is also common for a multi-node chassis to include a chassis management module that manages various aspects of the operation of the services and individual compute nodes. Optionally, a physical presence actuator or device may be secured to the chassis management module within the multi-server chassis. Non-limiting examples of physical presence actuator or device includes a button or switch.

The firmware interface may, for example, be a basic input output system (BIOS) or a unified extensible firmware interface (UEFI). Accordingly, the firmware interface setup program is a setup program for the BIOS or UEFI on a particular compute node. Each compute node may have its own instance of a firmware interface setup program. An authorized user can access the firmware interface setup program for a selected compute node and instruct the firmware interface to enable the trusted platform module on the selected compute node to be able to receive a physical presence signal by generating an enabling signal. For example, the firmware interface may provide the enabling signal on a general purpose input output (GPIO) pin of the firmware interface that is installed on the selected compute node. Most preferably, the compute node will have a motherboard that includes the firmware interface and the trusted platform module.

Another embodiment of the method uses an AND gate, or equivalent logic circuit, to control assertion of the physical presence signal to the trusted platform module of the selected compute node. In a specific implementation, a first input of an AND gate receives an enabling signal from the firmware interface for enabling the trusted platform module of the selected compute node to be able to receive a physical presence signal, and a second input of the AND gate receives the physical presence signal from the physical presence actuator or device. An output of the AND gate will assert the physical presence signal to the trusted platform module of the selected compute node in response to both the first input receiving the enabling signal and the second input receiving the physical presence signal. It should be understood that actuating the physical presence actuator or device will send a physical presence signal to each compute node, but only the selected compute node that receives an enabling signal will assert physical presence to the trusted platform module of the selected compute node.

In one option, the enabling signal may be provided for a predetermined period following the user providing an instruction to the firmware interface setup program. This gives the user time to manually actuate the physical presence actuator or device, such that both inputs to the AND gate will be positive at the same time. In another option, the physical presence signal to each of the plurality of compute nodes is provided for a predetermined period after manually actuating the device. This gives the user time to access the firmware interface setup program and provide an instruction causing the firmware interface to generate the enabling signal.

In a further embodiment, the firmware interface may enable the trusted platform module of the selected compute node to be able to receive a physical presence signal no more than once per boot of the selected compute node. Optional embodiments may be implemented so that the enabling of the trusted platform module does not persist across reboots of the selected compute node.

Another embodiment of the present invention provides a system comprising a multi-node chassis including a chassis management module, a plurality of compute nodes, and a physical presence manual actuator for transmitting a physical presence signal to each of the plurality of compute nodes within the multi-node chassis in response to manual actuation. Each server has a firmware interface, a trusted platform module, and an AND gate. The firmware interface has a general purpose input output pin for providing an enabling signal in response to a user instruction to a firmware interface setup program that communicates with the firmware interface. The AND gate has a first input receiving the enabling signal from the firmware interface, a second input receiving the physical presence signal from the physical presence manual actuator, and an output coupled to the trusted platform module, wherein the AND gate for a selected one of the plurality of compute nodes asserts physical presence to the trusted platform module of the selected compute node in response to receiving both the enabling signal and the physical presence signal.

The firmware interface of each compute node may, for example, be selected from a basic input output system (BIOS) and a unified extensible firmware interface (UEFI). Optionally, the firmware interface may provide the enabling signal for a predetermined period following the user instruction to the firmware interface setup program.

In yet another embodiment, the firmware interface may provide the enabling signal to the trusted platform module of the selected compute node no more than once per boot of the selected compute node, and the enabling signal does not persist across reboots of the selected compute node (i.e., the enabling signal reverts to being disabled).

Most preferably, the trusted platform module of the selected compute node may allow modification of one or more security setting of the selected compute node in response to receiving the physical presence signal.

Non-limiting examples of the physical presence manual actuator includes a button and a switch. Optionally, the physical presence manual actuator is secured to the chassis management module. In a further option, the physical presence signal from the physical presence manual actuator to each of the plurality of compute nodes may be provided for a predetermined period after manually actuating the physical presence manual actuator.

FIG. 1 is a diagram of multi-node chassis 10 including a chassis management module 12, a plurality of compute nodes 20 (NODE 1, NODE 2 through NODE N), and a physical presence ("PP") manual actuator 14 for transmitting a physical presence signal to each of the plurality of compute nodes within the multi-node chassis in response to manual actuation. Each server 20 has a firmware interface 22, a trusted platform module 24, and an AND gate 26 or equivalent logic circuit. The firmware interface 22 has a general purpose input output pin 28 for providing an enabling signal in response to a user instruction to a firmware interface setup program (not shown; see FIG. 2) that communicates with the firmware interface. The AND gate 26 has a first input receiving the enabling signal from the firmware interface 22, a second input receiving the physical presence signal from the physical presence manual actuator 14, and an output coupled to the trusted platform module 24, wherein the AND gate for a selected one of the plurality of compute nodes asserts physical presence to the trusted platform module of the selected compute node in response to receiving both the enabling signal and the physical presence signal.

Figure 2:
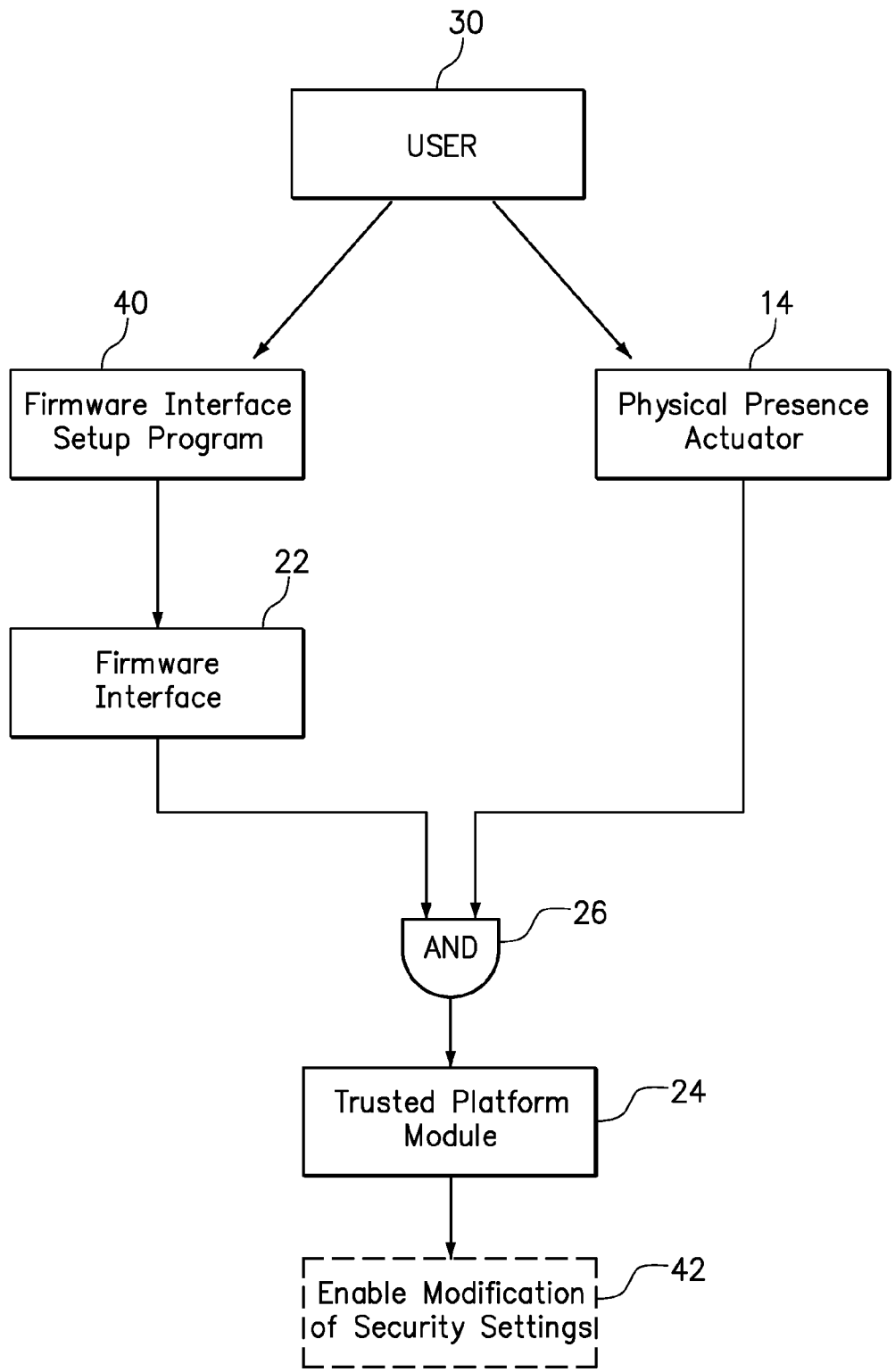
FIG. 2 is a conceptual diagram of one embodiment of the present invention.

FIG. 2 is a conceptual diagram of one embodiment of the present invention. In the diagram, a user 30 interacts with a firmware interface setup program 40, perhaps using a keyboard, mouse or other input output device, to provide an instruction that indicates the user wants to modify a security setting for a selected compute node. In response, the firmware interface setup program 40 may cause the firmware interface 22 of the selected compute node to generate an enabling signal to a first input of the AND gate 26. Preferably, the enabling signal will be active or positive during a predetermined time out period. The firmware interface setup program 40 may also provide a message to the user 30, perhaps as text on a video monitor or audio through a speaker, prompting the user to assert physical presence before the expiration of the time out period. Accordingly, the user 30 must manually actuate the physical presence actuator 14, which may be a button or switch located on a chassis management module within the same multi-node chassis as the plurality of compute nodes. Manually actuating the physical presence actuator 14 cause a physical presence signal to be sent to each of the plurality of compute nodes, although only the compute node with a firmware interface generating an enabling signal will be able to use the physical presence signal. Accordingly, the output of the AND gate 26 is provided to the trusted platform module (TPM) 24 as an assertion of physical presence. As a result, the trusted platform module 24 will enable modification of the security setting that the user previously requested of the firmware interface setup program 40.

Figure 3:
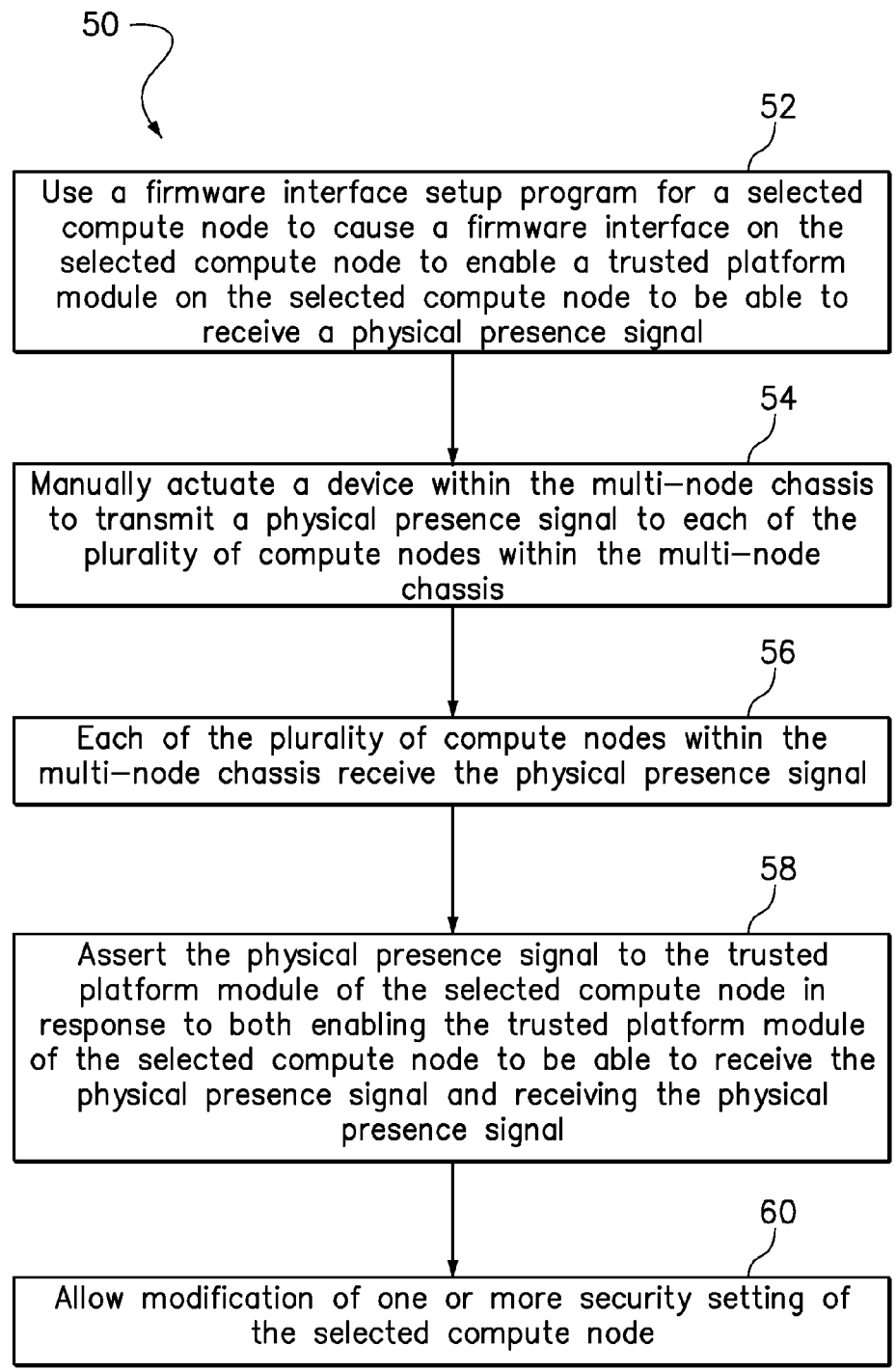
FIG. 3 is a flowchart of a method according to one embodiment of the present invention.

FIG. 3 is a flowchart of a method 50 according to one embodiment of the present invention. In step 52, a firmware interface setup program for a selected compute node is used to cause a firmware interface on the selected compute node to enable a trusted platform module on the selected compute node to be able to receive a physical presence signal. The selected compute node is selected from a plurality of compute nodes within a multi-node chassis, wherein each of the plurality of compute nodes includes a firmware interface and a trusted platform module. Step 54 includes manually actuating a device within the multi-node chassis to transmit a physical presence signal to each of the plurality of compute nodes within the multi-node chassis and, in step 56, each of the plurality of compute nodes within the multi-node chassis receive the physical presence signal. In step 58, the physical presence signal is asserted to the trusted platform module of the selected compute node in response to both enabling the trusted platform module of the selected compute node to be able to receive the physical presence signal and receiving the physical presence signal. Then, in step 60, the method allows modification of one or more security setting of the selected compute node in response to the trusted platform module of the selected compute node receiving the physical presence signal.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   using a firmware interface setup program for a selected compute node to cause a firmware interface on the selected compute node to enable a trusted platform module on the selected compute node to be able to receive a physical presence signal, wherein the selected compute node is selected from a plurality of compute nodes within a multi-node chassis, and wherein each of the plurality of compute nodes includes a firmware interface and a trusted platform module;
   manually actuating a device within the multi-node chassis to transmit a physical presence signal to each of the plurality of compute nodes within the multi-node chassis;
   each of the plurality of compute nodes within the multi-node chassis receiving the physical presence signal;
   asserting the physical presence signal to the trusted platform module of the selected compute node in response to both enabling the trusted platform module of the selected compute node to be able to receive the physical presence signal and receiving the physical presence signal; and
   allowing modification of one or more security setting of the selected compute node in response to the trusted platform module of the selected compute node receiving the physical presence signal.

2. The method of claim 1, wherein the firmware interface setup program is a setup program for a firmware interface selected from a basic input output system (BIOS) and a unified extensible firmware interface (UEFI).

3. The method of claim 1, wherein the firmware interface enables the trusted platform module on the selected compute node to be able to receive a physical presence signal by generating an enabling signal.

4. The method of claim 3, wherein the firmware interface provides the enabling signal on a general purpose pin of the firmware interface.

5. The method of claim 4, wherein the enabling signal is provided for a predetermined period following use of the firmware interface setup program.

6. The method of claim 1, wherein the physical presence signal to each of the plurality of compute nodes is provided for a predetermined period after manually actuating the device.

7. The method of claim 1, further comprising:
   the firmware interface enabling the trusted platform module of the selected compute node to be able to receive a physical presence signal no more than once per boot of the selected compute node.

8. The method of claim 7, wherein the enabling of the trusted platform module does not persist across reboots of the selected compute node.

9. The method of claim 1, wherein the device is secured to a chassis management module within the multi-node chassis.

10. The method of claim 1, wherein the device is a button or switch.

11. The method of claim 1, wherein the multi-node chassis is a multi-blade chassis and each node is a blade.

12. A method, comprising:
   using a firmware interface setup program for a selected compute node to cause a firmware interface on the selected compute node to enable a trusted platform module on the selected compute node to be able to receive a physical presence signal, wherein the selected compute node is selected from a plurality of compute nodes within a multi-node chassis, and wherein each of the plurality of compute nodes includes a firmware interface and a trusted platform module;
   manually actuating a device within the multi-node chassis to transmit a physical presence signal to each of the plurality of compute nodes within the multi-node chassis;
   each of the plurality of compute nodes within the multi-node chassis receiving the physical presence signal;
   a first input of an AND gate receiving an enabling signal from the firmware interface for enabling the trusted platform module of the selected compute node to be able to receive a physical presence signal;
   a second input of the AND gate receiving the physical presence signal from the device;
   an output of the AND gate asserting the physical presence signal to the trusted platform module of the selected compute node; and
   allowing modification of one or more security setting of the selected compute node in response to the trusted platform module of the selected compute node receiving the physical presence signal.

13. The method of claim 12, wherein the device is secured to a chassis management module within the multi-node chassis.

14. The method of claim 12, wherein the firmware interface setup program is a setup program for a firmware interface selected from a basic input output system (BIOS) and a unified extensible firmware interface (UEFI).

15. The method of claim 12, wherein the firmware interface enables the trusted platform module on the selected compute node to be able to receive a physical presence signal by generating an enabling signal.

16. The method of claim 15, wherein the firmware interface provides the enabling signal on a general purpose pin of the firmware interface.

17. The method of claim 16, wherein the enabling signal is provided for a predetermined period following use of the firmware interface setup program.

18. The method of claim 12, wherein the physical presence signal to each of the plurality of compute nodes is provided for a predetermined period after manually actuating the device.

19. The method of claim 12, further comprising:
   the firmware interface enabling the trusted platform module of the selected compute node to be able to receive a physical presence signal no more than once per boot of the selected compute node.

20. The method of claim 19, wherein the enabling of the trusted platform module does not persist across reboots of the selected compute node.

\* \* \* \* \*